United States Patent [19]
Tien et al.

[11] Patent Number: 5,977,215
[45] Date of Patent: Nov. 2, 1999

[54] LOW TEMPERATURE SELF-CROSSLINKING AQUEOUS DISPERSIONS OF URETHANE-VINYL POLYMERS FOR COATING APPLICATIONS

[75] Inventors: Chao-Fong Tien, Macungie; Chung-Ling Mao, Emmaus; Jeanine M. Snyder, Whitehall; Adalgery Beck, Easton, all of Pa.

[73] Assignee: Air Products and Chemicals, Inc., Allentown, Pa.

[21] Appl. No.: 08/876,785

[22] Filed: Jun. 16, 1997

Related U.S. Application Data

[62] Division of application No. 08/555,237, Nov. 8, 1995, abandoned, which is a division of application No. 08/280,047, Jul. 25, 1994, Pat. No. 5,521,246.

[51] Int. Cl.$^6$ ..................................................... C08L 63/00
[52] U.S. Cl. ........................... 523/415; 523/402; 523/417; 524/457; 524/507; 524/589; 524/590; 524/591
[58] Field of Search ...................... 524/457, 507, 524/589, 590, 291; 523/402, 415, 417

[56] References Cited

U.S. PATENT DOCUMENTS

| | | | |
|---|---|---|---|
| 3,479,310 | 11/1969 | Dieterich et al. | 260/29.2 |
| 3,684,758 | 8/1972 | Ludwig et al. | 260/29.6 NR |
| 3,759,873 | 9/1973 | Hudak et al. | 260/75 NK |
| 4,644,030 | 2/1987 | Loewrigkeit et al. | 524/457 |
| 4,927,876 | 5/1990 | Coogan et al. | 524/457 |
| 5,173,526 | 12/1992 | Vijayendran et al. | 524/457 |
| 5,218,031 | 6/1993 | Nayder et al. | 524/376 |
| 5,225,460 | 7/1993 | Sampath et al. | 523/409 |
| 5,227,414 | 7/1993 | Ernst et al. | 523/7 |
| 5,336,702 | 8/1994 | Kamikado | 523/17 |
| 5,418,264 | 5/1995 | Obloh et al. | 523/14 F |
| 5,422,392 | 6/1995 | Floyd et al. | 524/457 |
| 5,432,005 | 7/1995 | Tanigami et al. | 428/414 |
| 5,449,706 | 9/1995 | Iwase et a l. | 523/9 |

FOREIGN PATENT DOCUMENTS 0308115  of 0000   European Pat. Off. .

*Primary Examiner*—Judy M. Redding
*Attorney, Agent, or Firm*—Russell L. Brewer

[57] ABSTRACT

The present invention is directed to improved aqueous dispersions containing polyurethane/vinyl polymers. The improved aqueous dispersions comprise polymer particles of a urethane prepolymer having carboxyl functionality therein and a vinyl monomer polymerized thereon, which are shelf stable and self crosslinkable at a low temperature. The polyurethanes have pendant carboxyl functionality in quaternary form and pendant epoxide groups provided by glycidyl acrylates and/or methacrylates. When the aqueous dispersions are cast as film and the water is removed, crosslinking between the carboxyl group and the epoxide group occurs.

9 Claims, No Drawings

LOW TEMPERATURE SELF-CROSSLINKING AQUEOUS DISPERSIONS OF URETHANE-VINYL POLYMERS FOR COATING APPLICATIONS

This is a division, of application Ser. No. 08/555,237 filed Nov. 8, 1995, now abandoned which is a divisional of application Ser. No. 08/280,047 filed Jul. 25, 1994 now U.S. Pat. No. 5,521,246.

BACKGROUND OF THE INVENTION

This invention pertains to a process for the preparation of a shelf-stable self-crosslinking, one component aqueous urethane-vinyl polymer hybrid dispersions and to the shelf-stable, self-crosslinking dispersion itself.

Protective coatings for industrial application have been primarily solvent based using alkyd, polystyrene and nitrocellulose polymers. To meet the increasing environmental and safety concerns, the coatings industry is moving away from solvent-based systems towards water-based or high solids systems. Aqueous polyurethane hybrid dispersions have been developed for such applications. Patents describing aqueous polyurethane hybrid dispersions and their use, are as follows:

U.S. Pat. No. 4,644,030 discloses a method for making stable aqueous dispersions of polymeric material by producing an NCO-terminated polyurethane prepolymer in the presence of an inert liquid polymerizable monomer, dispersing the prepolymer in water, chain extending the prepolymer and then polymerizing vinyl monomer onto the polyurethane. The polyurethane prepolymer is prepared in conventional manner using a variety of available polyisocyanate, e g., aliphatic isocyanate, and reacting these isocyanate terminated polyurethanes with an active hydrogen-containing reactant, e.g., an hydroxyethylacrylate to form a polymerizable monomer and then dispersing this polymer in a monomer and an aqueous medium and effecting polymerization thereof. A water dispersing carboxyl providing reactant is incorporated into the polyurethane, such water-dispersing carboxyl reactant being an a,a-dimethylol $C_{2-10}$ alkenoic acid, e.g., dimethylol propionic acid.

U.S. Pat. No. 3,684,758 discloses stable aqueous polymer dispersions which are formed by dispersing a polyurethane in vinyl monomer and then subjecting the vinyl monomer to radical polymerization in the aqueous medium in the presence of an emulsifier. A wide variety of monomers are suggested as being suited for polymerization in the presence of the polyurethane dispersed in the aqueous medium.

U.S. Pat. No. 3,759,873 discloses water dispersible polyurethane based polyesters prepared from carboxy polyols. The urethane modified unsaturated polyesters are then dissolved in a copolymerizable ethylenically unsaturated monomer and polymerized. These polyesters then can be blended with aminoplasts establishing a two-package system for effecting crosslinking at a later time. U.S. Pat. No. 5,225,460 discloses shelf stable emulsions based upon epoxy-based functional polymers and amino-containing hardeners. Shelf stability with crosslinking functionality is achieved through the use of a nonionic emulsifier, an emulsion polymerizable monomer having epoxy functional pendant groups and an emulsion polymerizable monomer having ethylenically unsaturated functionality.

U.S. Pat. No. 3,479,310 discloses improved polyurethane dispersions in water which are free from emulsifiers. The polyurethane dispersions contain from about 0.02 to about 1% of salt type groups, including quaternary nitrogen salts.

EPO 0 308 115 discloses surfactant free aqueous polymer dispersions containing an anionic water-dispersible polyurethane and a vinyl polymer.

U.S. Pat. No. 5,173,526 discloses a process for making stable aqueous urethane-acrylic polymer dispersions by subjecting vinyl monomers to radical emulsion polymerization in the presence of a high molecular weight polyurethane containing anionic groups.

BRIEF SUMMARY OF THE INVENTION

The present invention is directed to improved aqueous dispersions containing polyurethane/vinyl polymers and to a method for making such aqueous polyurethane-vinyl polymer dispersion. The aqueous dispersions comprise a urethane prepolymer having carboxyl functionality therein and a vinyl monomer polymerized therewith. The improvement in these dispersions resides in shelf-stability and self crosslinkability. This is achieved by converting the carboxylic acid functionality present in the polyurethane prepolymer to a quaternary ammonium carboxylate and incorporating polymer having pendant epoxide groups. When the aqueous dispersions are cast as a film, and the water removed, the quaternary ammonium carboxylate salt decomposes and crosslinking between the regenerated carboxylic acid group and epoxide group occurs.

The aqueous polymer dispersion is prepared generally by (a) forming a carboxylic acid-containing, water-dispersible, isocyanate-terminated polyurethane prepolymer, (b) adding a vinyl monomer, i.e., an ethylenically unsaturated monomer to the prepolymer to make a prepolymer/monomer mixture, (c) adding a tertiary amine capable of converting the carboxylic acid group on the isocyanate terminated prepolymer to a quaternary ammonium carboxylate to the prepolymer/monomer mixture, (d) dispersing the prepolymer/vinyl monomer mixture in water, (e) optionally adding an oil-soluble free radical initiator and a chain extender to the aqueous dispersion, (f) polymerizing the vinyl monomer and completing the chain extension of the prepolymer by heating the aqueous dispersion, and, (g) incorporating a polymer having pendant epoxide groups into the emulsion.

There are significant advantages associated with this invention and they include:

an ability to form aqueous dispersions which are shelf stable and self crosslinkable;

an ability to produce a surfactant-free dispersion for producing water resistant films; and, an ability to effect crosslinking of films generated from the dispersions at low temperatures.

DETAILED DESCRIPTION OF THE INVENTION

The isocyanate-terminated polyurethane prepolymers are commonly produced by reacting organic material containing an average of at least about two active hydrogen atoms per molecule, usually a diol and preferably a polyester polyol, with a stoichiometric excess of an organic diisocyanate. Preferably, a suitable proportion of the organic material also contains, as means for providing anionic water dispersibility to the prepolymer, at least one comparatively unreactive pendant carboxylic acid group. This carboxylic acid group is quaternized with a tertiary amine after prepolymer formation and addition of the monomers.

The polyisocyanates used in making the prepolymer may be an aliphatic, cycloaliphatic, araliphatic or aromatic polyisocyanate. Examples of suitable polyisocyanates include ethylene diisocyanate; 1,6-hexamethylene diisocyanate, isophorone diisocyanate, cyclohexane-1,4-diisocyanate, 4,4'-dicyclohexylmethane diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates can also be used.

Polymeric polyols having molecular weights in the range of 500–6000 may be used in the preparation of the prepolymer and these include diols, triols and mixtures thereof. Higher functionality polyols may also be used, for example, as minor components in admixture with diols. The polyols may be members of any of the chemical classes of polymeric polyols used or proposed to be used in polyurethane formulations. In particular, the polyols may be polyesters, polyesteramides, polyethers, polythioethers, polycarbonates, polyacetals, polyolefins or polysiloxanes. Preferred polyol molecular weights are from 700–3000.

Polyester polyols which may be used include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric and adipic acids or their methyl esters, phthalic anhydride or dimethyl terephthalate. Polyesters obtained by the polymerization of lactones, for example caprolactone, in conjunction with the polyol may also be used. Polyesteramides may be obtained by the inclusion of amino-alcohols such as ethanolamine in the polyesterification mixtures.

Polyether polyols which may be used include products obtained by the polymerization of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylol propane, pentaerythritol or Bisphenol A. Especially useful polyethers include polyoxypropylene diols and triols, poly(oxyethylene-oxypropylene) diols and triols obtained by the simultaneous or sequential addition of ethylene and propylene oxides to appropriate initiators and polytetramethylene ether glycols obtained by the polymerization of tetrahydrofuran.

Polythioether polyols which may be used include products obtained by condensing thiodiglycol, either alone or with other glycols, dicarboxylic acids, formaldehyde, amino-alcohols or amino carboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerizing cyclic acetals.

Suitable polyolefin polyols include hydroxy-terminated butadiene homo- and copolymers.

Isocyanate-reactive compounds containing acid groups which may be used in the preparation of the anionic water-dispersible prepolymers include carboxy group containing diols and triols, for example dihydroxyalkanoic acids of the formula:

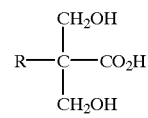

wherein R is hydrogen or a $C_1$–$C_{10}$ alkyl group. The preferred carboxy- containing diol is 2,2-dimethylolpropionic acid. If desired, the carboxy- containing diol or triol may be incorporated into a polyester by reaction with a dicarboxylic acid before being incorporated into the prepolymer. Useful acid group containing compounds include aminocarboxylic acids, for example lysine, cystine and 3,5-diaminobenzoic acid.

The anionic water-dispersible isocyanate-terminated polyurethane prepolymer may be prepared in conventional manner by reacting a stoichiometric excess of the organic polyisocyanate with the polymeric polyol and any other required isocyanate-reactive compounds under substantially anhydrous conditions at a temperature between about 30° C. and 130° C. until the reaction between the isocyanate groups and the hydroxyl groups is substantially complete. A polyisocyanate and the active hydrogen containing components are suitably reacted in such proportions that the ratio of number of isocyanate groups to the number of hydroxyl groups is in the range from about 1.1:1 to about 6:1, preferably within the range of from 1.5:1 to 3:1. If desired, tin catalysts may be used to assist prepolymer formation.

To disperse the prepolymer in water, a tertiary amine is added to the mixture in an amount sufficient to quaternize the carboxylic acid groups therein and to render the prepolymer water dispersible. Typically this is at a level of 65–100% amine equivalents per carboxyl equivalent. Tertiary amines that may be used in the practice of the invention are relatively volatile so that they evaporate from the coating upon curing. Examples of suitable amines are represented by the formula:

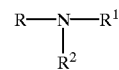

where R, $R^1$ and $R^2$ are independently $C_1$–$C_6$, preferably $C_2$–$C_4$ alkyl and aliphatic groups. Illustrative of such tertiary amines are trimethylamine, triethylamine, tri-n-butylamine, tricyclohexylamine, dimethylethylamine, and methyldiethylamine. To enhance the compatibility of the organic and aqueous phases, a small quantity of a polar organic liquid such as N-methylpyrrolidone can be added in amounts ranging from 1 to 12 wt %, preferably 3–6 wt %, of the final polymer dispersion. The prepolymer may be dispersed in water using techniques well known in the art. Preferably, the prepolymer is added to the water with agitation, or, alternatively, water may be stirred into the mixture.

To increase molecular weight of the polyurethane, optionally a chain extender containing active hydrogen atoms is added. The active hydrogen-containing chain extender which is reacted with the prepolymer is suitably a polyol, an amino alcohol, ammonia, a primary or a secondary aliphatic, alicyclic, aromatic, araliphatic or heterocyclic amine, especially a diamine. The amount of chain extender employed should be approximately equivalent to the free isocyanate groups in the prepolymer, the ratio of active hydrogens in the chain extender to isocyanate groups in the prepolymer preferably being in the range from 0.7 to 1.3:1. Of course when water is employed as the chain extender, these ratios will not be applicable since the water, functioning as both a chain extender and dispersing medium, will be present in a gross excess relative to the free isocyanate groups.

Examples of suitable chain extenders include ethylenediamine, diethylene triamine, triethylenetetramine, propylenediamine, butylenediamine, hexamethylenediamine, cyclo-hexylenediamine, piperazine, 2-methyl piperazine, phenylenediamine, toluenediamine, tris(2-aminoethyl)amine, 4,4'-methylenebis(2-chloraniline), 3,3'-dichloro-4,4'diphenyl diamine, 2,6-diaminopyridine, 4,4'-diaminodiphenyl methane, isophorone diamine, and adducts of diethylenetriamine.

Suitable ethylenically unsaturated monomers and vinyl monomers which are combined with the prepolymer in the aqueous medium and polymerized include ethylenically unsaturated hydrocarbons, esters and ethers, especially esters of acrylic and methacrylic acids, esters of vinyl alcohol and styrene. Specific examples include styrene, substituted styrenes, the lower alkyl ($C_1$–$C_6$) esters of acrylic, methacrylic and maleic acids, vinyl acetate and butyrate, acrylonitrile, vinyl methyl, propyl and butyl ethers, allyl ethers, vinyl chloride, vinylidene chloride, and the like. Suitable polyethylenically unsaturated monomers include butadiene, isoprene, allylmethacrylate, diacrylate esters of $C_2$–$C_6$ diols such as butanediol diacrylate and hexanediol diacrylate, divinyl benzene, divinyl ether, divinyl sulfide, trimethylolpropane triacrylate and the like.

The key to self crosslinkability of the polymer in the aqueous dispersion is the incorporation of a polymer having pendant epoxide groups thereon. These epoxide groups are reactive with carboxylic acid group and can react at low temperature, e.g., 20–40° C. In the aqueous medium they are unreactive when the quaternary ammonium carboxylate form of the carboxylic acid group is present in the polyurethane prepolymer.

The epoxide groups may be incorporated into the aqueous medium by at least two methods, one being the incorporation of a monomer having pendant epoxy groups along with the vinyl or ethylenically unsaturated monomers to be polymerized in the presence of the polyurethane prepolymer and the other being the incorporation of a polymer having pendant epoxy groups and the subsequent incorporation of that polymer in the aqueous dispersion. In the latter case the polymer itself may be present as a suspension or emulsion in water or may be in solid form and dispersed into the emulsion. The preferred mechanism for incorporation of pendant epoxide groups is the polymerization of monomers having epoxy functionality with the ethylenically unsaturated monomer and subsequent polymerization thereof. Examples of monomers having epoxy functionality include glycidyl acrylate and glycidyl methacrylate, 4-epoxy styrene, allyl glycidyl ethers, and butene epoxide. Glycidyl ethers based upon epihalohydrin derivatives of bridged aliphatic alcohols, e.g., methylenedi(cyclohexanol), and alkylene oxide derivatives thereof may also be used.

Water borne or emulsifiable polymers of glycidyl ethers of aliphatic and phenolic polyols may be added as the epoxy component. Examples include glycidyl ethers of bisphenol A and bisphenol F. Other polymer systems may comprise polymers of ethylenically unsaturated monomers with the monomers having epoxy functionality, e.g. an acrylate/glycidyl methacrylate copolymer. The resulting polymer then may be dispersed into the aqueous dispersion.

To effect crosslinking, the epoxide groups are present in an amount of from about 0.5 to 5 epoxide groups per carboxyl group, preferably from 1 to 3 epoxide groups per carboxyl group. Residual epoxide groups may be added and reacted with other additives. The crosslink density generally is controlled by the level of carboxyl functionality in the polyurethane prepolymer. Typically, the level of carboxyl functionality will range from about 0.5 to 1 equivalent carboxyl groups per 1,000 average molecular weight of the polyurethane prepolymer. If excess epoxy functionality is provided, then additional labile hydrogen source may be added to enhance crosslink density.

Free radical polymerization of the monomer mixture and the chain extension of the prepolymer is conducted at an elevated temperature, namely at a temperature sufficient to liberate free radicals at a rate that sustains the polymerization reaction and to complete chain extension of the prepolymer since the chain extending reaction begins to proceed upon the addition of the chain extender to the aqueous dispersion. A suitable temperature range is 50 to 90° C., preferably 60 to 80° C.

In order to obtain improved water resistance, the free radical initiator should be an oil soluble material, meaning a free radical generating material that preferentially partitions into the organic phase compared to the aqueous phase, i.e. not substantially soluble in the aqueous phase. Suitable oil soluble free radical initiators would include azo-type initiators such as 2,2'azobis(2,4-dimethylpentanenitrile) and 2,2' azobis(2-methylpropane-nitrile) [AIBN]. Redox systems comprising reducing agents and oxidizing agents (free radical initiators) as are well known in the polymerization art can also be used, but the free radical initiator preferably should be oil soluble.

Polymerization of the monomers generally involves initially adding a portion of the monomers to the prepolymer, neutralizing with tertiary amine and dispersing the prepolymer/monomer mixture in water followed by polymerization during which additional monomers (the same or different) are added during the polymerization process. Alteratively, the second portion of the monomer composition can be added to the prepolymer/monomer dispersion after amine addition and equilibrated by stirring before effecting polymerization. The proportion of monomers used, based on total solids in the resulting dispersion, is suitably from 25 to 75%, preferably from 40 to 60% by weight.

The polymer dispersions obtained can comprise 20 to 60 weight percent solids and may be employed as coating compositions and applied to any substrate including wood, metals, glass, cloth, leather, paper, plastics, foam and the like by any conventional method including brushing, dipping, flow coating, spraying and the like. After application of the aqueous composition to a substrate the dispersion is dried and cured at temperatures ranging from ambient to 150° C. for times ranging from 24 hours to 5 minutes.

The aqueous polyurethane-vinyl polymer dispersions can be applied by conventional methods and the resultant coatings provide a good balance of protection from solvents, corrodants, and abrasion and good gloss and flexibility. Other substrates to which the polyurethane/hybrid polymer dispersions can be applied include metals such as steel and aluminum, plastics such as high impact polystyrene, polycarbonate, Mylar polyester, polypropylene, and wood.

Although not intending to be bound by theory, reactivity between carboxylic acid groups and epoxide groups within the same polymer system is overcome by blocking the carboxylic acid group via quaternization with a tertiary amine. In a self-crosslinkable urethane hybrid system, water pulls the ammonium salts of the carboxylate groups towards an oil-water interface and the ammonium salts of the carboxylate groups stabilize the latex dispersion through electrostatic interaction. The epoxide groups are buried inside the oil phase and are separated from the ammonium carboxylate salt groups. This chemistry thereby minimizes encounters between the carboxylate groups and the epoxide groups leading to a stable aqueous dispersion. When the dispersion is cast as a film, the water and amine evaporate. With the evaporation of the amine the carboxylate is converted back to the carboxylic acid group and the epoxide groups react therewith.

The following examples are intended to represent embodiments of the invention and are not intended to limit the scope thereof.

COMPARATIVE EXAMPLE 1

Water-based Urethane-Acrylic Hybrid Polymer Control

This example illustrate the process of preparation a water-based urethane-acrylic hybrid polymer dispersion control.

| I. | Raw Materials: | Amount by weight |
|---|---|---|
| 1. | Formerz 55-56[a] | 100.6 |
| 2. | Desmodur W[b] | 91.8 |
| 3. | Dabco T-12[c] | 0.26 |
| 4. | 2,2-Bis(hydroxymethyl)propionic Acid | 14.8 |
| 5. | 1-Methyl-2-Pyrrolidinone | 54.9 |
| 6. | Butyl Methacrylate | 206.4 |
| 7. | 1,6-Hexanediol Diacrylate | 0.89 |
| 8. | Triethylamine | 10.6 |
| 9. | Deionized Water | 492.6 |
| 10 | Ethylenediamine | 10.1 |
| 11 | Deionized Water | 19.5 |
| 12 | Vazo-64[d] | 0.91 |
| 13 | 1-Methyl-2-Pyrrolidinone | 8.26 |

[a]Poly(neopentyl adipate) MW~2000 from Witco Chemical.
[b]methylene di(cyclohexylisocyanate
[c]Dibutyltin dilaurate from Air Products and Chemicals, Inc.
[d]AIBN from DuPont.

II Process

The polyester polyol (1) was charged into a nitrogen purged 1-L reactor. To this was added an aliphatic diisocyanate (2) and a tin catalyst (3). This mixture was allowed to stir at 92° C. for 1 hour. With constant stirring, the acid diol (4) was added followed by the 1-Methyl-2-Pyrrolidione (5). The mixture was held at 93° C. for 5.25 hours.

The prepolymer was cooled to 75° C. and acrylic monomer (6) was added. The mixture was stirred for 15 minutes before a sample was removed to determine the free percent NCO. Next the diacrylate (7) was added. After cooling the mixture to 25° C., triethylamine (8) was added and allowed to react for 1 hour. Following the neutralization and quaterization of the acid, the prepolymer was dispersed into deionized water (9). To chain extend, ethylenediamine (10) was dissolved in deionized water (11), added to the reactor, and allowed to react for 2 hours. Lastly, a free radical initiator (12) dissolved in 1-Methyl-2-Pyrrolidinone (13) was added. After 5 minutes, the dispersion was heated to 75° C. and held for 2 hours. The dispersion was cooled to room temperature and filtered through a cheese cloth.

EXAMPLE 2

Low Temperature, Self Crosslinkable Water-Based Urethane-Acrylic Hybrid

The example is representative of a method for the preparation of a crosslinkable glycidyl methacrylate containing water-based urethane-acrylic hybrids.

| I. | Raw Materials: | Amount by weight |
|---|---|---|
| 1. | Formerz 55-56[a] | 101.7 |
| 2. | Desmodur W[b] | 92.0 |
| 3. | Dabco T-12[c] | 0.27 |
| 4. | 2,2-Bis(hydroxymethyl)propionic Acid | 14.8 |
| 5. | 1-Methyl-2-Pyrrolidinone | 54.6 |
| 6. | Butyl Methacrylate | 141.2 |
| 7. | 1,6-Hexanediol Diacrylate | 0.88 |
| 8. | Triethylamine | 10.4 |
| 9. | Deionized Water | 483.4 |
| 10 | Vazo-52[d] | 0.86 |
| 11 | 1-Methyl-2-Pyrrolidinone | 8.09 |
| 12 | Ethylenediamine | 9.5 |
| 13 | Deionized Water | 19.3 |
| 14 | Butyl Methacrylate | 31.2 |
| 15 | Glycidyl Methacrylate | 28.7 |

[a]Poly(neopentyl adipate) MW~2000 from Witco Chemical.
[b]methylene di(cyclohexylisocyanate
[c]Dibutyltin dilaurate from Air Products and Chemicals, Inc.
[d]AIBN from DuPont.

The general procedure of Example 1 was repeated except that in this instance glycidyl methacrylate was added as a monomer along with the other acrylate monomers as were utilized in Example 1. First, the polyester polyol (1) was charged into a nitrogen purged 1-L reactor. To this was added an aliphatic diisocyanate (2) and a tin catalyst (3). This mixture was allowed to stir at 88° C. for 2.25 hours. With constant stirring, the acid diol (4) was added followed by the 1-Methyl-2-Pyrrolidinone (5). The mixture was held at 91° C. for 5.75 hours.

The prepolymer was cooled to 75° C. and the acrylic monomer (6) was added. The mixture stirred for 15 minutes before a sample was removed to determine the free percent NCO. Next, the acrylate (7) was added. After cooling to 25° C., triethylamine (8) was added and allowed to react for 1 hour. Following the neutralization, the prepolymer was dispersed into deionized water (9). Next a free radical initiator (10) dissolved in 1-Methyl-2-Pyrrolidinone (11) was added. After a half hour, ethylenediamine (12) in deionized water (13) was added to carry our the chain extension. This reaction took place for 2.5 hours. Lastly, butyl methacrylate (14) and glycidyl methacrylate (15) were added. After mixing for 15 minutes, the mixture was heated to 65° C. and held there for 2.25 hours. The dispersion was cooled to room temperature and filtered through a cheese cloth.

EXAMPLE 3

Low Temperature, Self Crosslinkable Water-Based Urethane-Acrylic Hybrid

The procedure of Example 2 was repeated except the formulation was modified by changing the relative amounts of glycidyl methacrylate (15), e.g., at 2.5, 5, 7.5 and 10% by weight glycidyl methacrylate levels were added. Weight percent glycidyl methacrylate is based upon the total weight of the ethylenically unsaturated monomers added and reacted. All other parameters were essentially the same.

EXAMPLE 4

Swell Ratio Determination

Films were made from the above urethane-acrylic hybrid emulsions for the purpose of determining properties. The method for determining swell ratio is as follows:

1. Sample preparation: A film of the emulsion was prepared on a glass plate. The film was dried overnight and removed from the plate the following day. Total drying time was about 24 hours at room temperature. At this point, the samples were placed in a conditioned laboratory for an additional 24 hours. (72° F., 50% Rh)

2. Test procedure: The samples were cut into a 1"×1" square and weighed to four digits. The samples were immersed into 100% ethyl alcohol for 72 hour period. Each sample was blotted dry and weighed in closed container.

3. Results:

| Sample Swell Ratio | |
|---|---|
| Control | Dissolved within 24 hr |
| 2.5% GMA | 2.1 |
| 5% GMA | 2.2 |
| 7.5% GMA | 1.7 |
| 10% GMA | 1.6 |

The results show that solvent resistance improved with increasing levels of crosslinkage. However, the results also show excellent solvent resistance even at the low 2.5% level. Without crosslinking the coating had no solvent resistance. The results show that above about 7.5% glycidyl methacrylate crosslink density did not substantially increase for that formulation.

STATEMENT OF INDUSTRIAL APPLICATION

The present invention provides a method for preparing aqueous polyurethane/vinyl polymer dispersion which are especially suited as industrial coatings having a good balance of protection from solvents, corrodants, abrasion and good gloss and flexibility.

We claim:

1. In an aqueous dispersion comprising a water dispersible isocyanate terminated urethane prepolymer having pendant carboxyl functionality, said water dispersible polyurethane formed by the reaction of a diisocyanate, a polyol and dihydroxyalkanoic acid, said water dispersible isocyanate terminated urethane prepolymer having vinyl monomer polymerized thereon thereby forming a urethane/acrylic hybrid, the improvement residing in a one component urethane/acrylic hybrid having shelf-stability and self crosslinkability which comprises:

said water dispersible isocyanate terminated urethane prepolymer having the carboxyl functionality provided by said dihydroxyalkanoic acid converted to quaternary ammonium carboxylate; and, said vinyl monomer comprises a glycidyl acrylate or glycidyl methacrylate.

2. The dispersion of claim 1 in which the dihyroxyalkanoic acid is 2,2-dimethylolpropionic acid.

3. The dispersion of claim 2 in which the quaternary ammonium carboxylate is the reaction product of a trialkylamine where the alkyl portion of the amine has from 1–4 carbon atoms and the carboxyl functionality is provided by 2,2-dimethylolpropionic acid.

4. The dispersion of claim 1 wherein the glycidyl acrylate or glycidyl methacrylate is present in an amount to provide from 1 to 3 epoxide groups per quaternary ammonium carboxylate group.

5. The aqueous dispersion of claim 1 wherein the diisocyanate in said isocyanate terminated urethane prepolymer is derived from methylene diisocyanate.

6. The aqueous dispersion of claim 5 wherein the urethane/acrylic hybrid further comprises polymerized units of a $C_{1-6}$ alkyl ester of acrylic or methacrylic acid and said $C_{1-6}$ alkyl ester of acrylic or methacrylic acid is butyl acrylate or butyl methacrylate.

7. The aqueous dispersion of claim 6 wherein the polyol in said urethane prepolymer is a polyester diol.

8. The aqueous dispersion of claim 7 wherein the polyester diol is poly(neopentyl)adipate.

9. The dispersion of claim 7 wherein the glycidyl acrylate or glycidyl methacrylate is present in an amount to provide from 1 to 3 epoxide groups per carboxylic acid group.

\* \* \* \* \*